United States Patent
Saito et al.

(10) Patent No.: US 10,305,326 B2
(45) Date of Patent: May 28, 2019

(54) CONTACTLESS ELECTRIC POWER SUPPLY DEVICE

(71) Applicant: FUJI MACHINE MFG. CO., LTD., Chiryu (JP)

(72) Inventors: Masaru Saito, Fussa (JP); Shinji Takikawa, Nagoya (JP)

(73) Assignee: FUJI CORPORATION, Chiryu (JP)

( * ) Notice: Subject to any disclaimer, the term of this patent is extended or adjusted under 35 U.S.C. 154(b) by 114 days.

(21) Appl. No.: 15/324,907

(22) PCT Filed: Jul. 16, 2014

(86) PCT No.: PCT/JP2014/068955
§ 371 (c)(1),
(2) Date: Jan. 9, 2017

(87) PCT Pub. No.: WO2016/009513
PCT Pub. Date: Jan. 21, 2016

(65) Prior Publication Data
US 2017/0201124 A1    Jul. 13, 2017

(51) Int. Cl.
*H02J 50/90* (2016.01)
*H02J 50/10* (2016.01)
(Continued)

(52) U.S. Cl.
CPC ............ *H02J 50/10* (2016.02); *H02J 50/60* (2016.02); *H02J 50/80* (2016.02); *H02J 50/90* (2016.02)

(58) Field of Classification Search
CPC . H02J 5/005; H02J 7/025; H02J 17/00; B60L 11/182; H01F 38/14
See application file for complete search history.

(56) References Cited

U.S. PATENT DOCUMENTS

| | | | |
|---|---|---|---|
| 2008/0157603 A1* | 7/2008 | Baarman | H02J 7/025 307/104 |
| 2009/0284164 A1* | 11/2009 | Ray | G09G 3/14 315/218 |

(Continued)

FOREIGN PATENT DOCUMENTS

| | | |
|---|---|---|
| JP | 9-307283 A | 11/1997 |
| JP | 2005-288138 A | 10/2005 |

(Continued)

OTHER PUBLICATIONS

English machine translation of JP2005-288138 published Oct. 20, 2005.*

(Continued)

*Primary Examiner* — Rexford N Barnie
*Assistant Examiner* — David A Shiao
(74) *Attorney, Agent, or Firm* — Oblon, McClelland, Maier & Neustadt, L.L.P.

(57) ABSTRACT

A contactless electric power supply device includes: a supply coil provided on a supply side device; a high frequency power source circuit that applies high frequency voltage to the supply coil; a receiver coil provided on a receiver side device that is arranged facing the supply side device, the receiver coil receiving high frequency electric power by contactless electric power supply via electromagnetic coupling with the supply coil; a receiver circuit that converts the high frequency electric power received by the receiver coil and supplies power to an electric load of the supply side device; and a supplementary coil provided on the supply side device, the supplementary coil interlinking with at least a portion of a magnetic circuit that electromagnetically couples the supply coil and the receiver coil.

19 Claims, 5 Drawing Sheets

(51) Int. Cl.
*H02J 50/80* (2016.01)
*H02J 50/60* (2016.01)

(56) References Cited

U.S. PATENT DOCUMENTS

| | | | | |
|---|---|---|---|---|
| 2010/0039833 A1* | 2/2010 | Coulson | ............ | H02M 3/33515 |
| | | | | 363/21.05 |
| 2010/0106223 A1* | 4/2010 | Grevious | ............ | A61N 1/3706 |
| | | | | 607/60 |
| 2010/0172168 A1* | 7/2010 | Fells | ............ | H02J 7/025 |
| | | | | 363/164 |
| 2012/0262000 A1* | 10/2012 | Urano | ............ | H01F 38/14 |
| | | | | 307/104 |
| 2014/0368167 A1* | 12/2014 | Okura | ............ | H02J 5/005 |
| | | | | 320/109 |
| 2015/0028875 A1* | 1/2015 | Irie | ............ | G01V 3/10 |
| | | | | 324/345 |
| 2017/0179772 A1* | 6/2017 | Asanuma | ............ | H02J 17/00 |

FOREIGN PATENT DOCUMENTS

| | | |
|---|---|---|
| JP | 2006-317387 A | 11/2006 |
| JP | 2010-283257 A | 12/2010 |
| JP | 2011-078266 A | 4/2011 |

OTHER PUBLICATIONS

English machine translation of JP9-307283 published Nov. 28, 1997.*
International Search Report dated Oct. 7, 2014 in PCT/JP2014/068955 filed Jul. 16, 2014.

* cited by examiner

FIG. 8
Supplementary coil
tertiary voltage V3

High   Coupling degree   Low
(Small    Gap GL    Large)

FIG. 9
Linearized
output signal Vout

High   Coupling degree   Low
(Small    Gap GL    Large)

FIG. 10

CONTACTLESS ELECTRIC POWER SUPPLY DEVICE

TECHNICAL FIELD

The present application relates to a contactless electric power supply device that supplies power in a contactless manner via electromagnetic coupling of a supply coil and a receiver coil, in particular, it relates to a contactless electric power supply device provided with a supplementary coil on the supply side.

BACKGROUND ART

Board work machines such as solder printers, component mounters, reflow ovens, and board inspection machines are used to produce boards mounted with many components. These board work machines are often connected to each other to form a board production line. Among this equipment, component mounters provided with a board conveyance device, a component supply device, a component transfer device, and a control device are typical. A typical example of a component supply device is a feeder device that feeds tape in which many electronic components are stored at a specified pitch. Feeder devices are flat and thin in the width direction, and typically multiple feeder devices are arranged in a row on a base of the component mounter. Feeder devices have a motor in a mechanism that supplies components, and also a control section that controls operation of the motor.

Conventionally, contact-type electric power supply multi-terminal connectors are used for supplying electricity to the feeder device from the main body of the component mounter. However, with multi-terminal connectors, there is a problem of terminals being deformed or damaged due to repeated detachment and attachment. As a countermeasure to this, in recent years, the use of contactless electric power supply devices such as electromagnetic coupling type devices and electrostatic coupling type devices has progressed. Supply coils and receiver coils used in electromagnetic coupling type contactless electric power supply devices are each provided with a core, with a magnetic circuit being formed from the cores being arranged facing each other.

With an electromagnetic coupling type contactless electric power supply device, if the degree of coupling for the electromagnetic coupling lowers due to a gap arising between the cores, the ability to supply electricity is lowered. Thus, technology has been developed that controls changes in electric supply conditions while monitoring the size of the gap between the cores and the supply ability, an example of which is disclosed in patent literature 1. The contactless electric power supply device of patent literature 1 is provided with: an isolation transformer for which a supply side core and a receiver side core are separable and that includes a supplemental winding on the supply side core; and a mechanism recognizing section provided on the supply side core that mechanically recognizes information of the receiver side. Referring to claims 2 and 3 and an embodiment in patent literature 1, the mechanism recognizing section is configured to recognize the depth dimension of the receiver side plug so as to distinguish the type of load being received, and set the target voltage of the load side accordingly. Further, referring to claim 4, the detected voltage of the supplemental winding is taken as an indicator for performing control so as to supply a specified voltage to the load side.

The above mechanism recognizing section and supplemental winding are considered not to have a function that measures the size of the gap between the cores, and even if they were to possess such a measuring function, the measuring accuracy would be low. Conventional technology for measuring the size of a gap or the like, or the displacement of members is technology that uses light such as infrared or laser, or technology that uses magnetism or ultrasound. Technology that uses magnetism is appropriate for measuring proximity distances such as the size of the gap between cores, and an example of such technology is disclosed in patent literature 2. The distance measuring device of patent literature 2 is provided with a displacement sensor for which the inductance changes according to the distance to a measurement target object, an oscillation circuit that enables the frequency of the drive signal supplied to the displacement sensor to vary, a means for extracting the inductance of the displacement sensor based on changes to the frequency of the drive signal, and a means for measuring the distance to the measurement target object based on the extracted inductance. According to this, influences due to the resistance component and the capacity component of the displacement sensor are eliminated, and measurement is possible by only extracting the inductance component, which means that a highly precise distance measurement is achieved.

CITATION LIST

Patent Literature

Patent Literature 1: JP-A-2011-78266
Patent Literature 2: JP-A-2006-317387

SUMMARY

As given above, with the technology of patent literature 1, it is considered that there is no function for measuring the size of the gap between cores. On the other hand, according to the technology of patent literature 2, it is possible to measure the size of the gap between cores. However, separate to the circuit configuration of the contactless electric power supply, a displacement sensor, oscillation circuit, and inductance extracting means are required, making the configuration complex; this gives rise to undesirable cost increases and constraints on setup space and so on. In other words, if a function for measuring the degree of electromagnetic coupling or the size of the gap between cores can be combined into the circuit configuration of the contactless electric power supply, a highly functional contactless electric power supply device with added functionality can be achieved while maintaining a simple configuration.

Also, with a contactless electric power supply device, in order to protect circuits, a configuration is used that prevents too much current flowing when the size of the gap between cores may increase during use and when the electric load on the receiver size becomes excessive. That is, in order to prevent circuits from excessive current, a section that measures the current and a control section that restricts the current are provided. If such a function for protecting from excessive current can be combined in the circuit configuration of the contactless electric power supply, a highly functional contactless electric power supply device with added functionality can be achieved while maintaining a simple configuration. Further, if both a function for measuring the size of the gap or the degree of coupling and a function for protecting from excessive current can be combined, an even more highly functional contactless electric power supply device with various added functionality can be achieved.

Note that, use of a contactless electric power supply device is not limited to a feeder device of a component mounter; use may be applied to a wide range of fields such as other types of board work machines and processing machines and assembly machines that produce other goods.

In view of the problems noted above with conventional technology, an object of the present disclosure is to provide a highly functional contactless electric power supply device with added functionality and a simple configuration by combining a measuring function that measures the degree of electromagnetic coupling, or a function for protecting against excessive current, with the circuit configuration of the contactless power supply.

To solve the above problems, the contactless electric power supply device includes: a supply coil provided on a supply side device; a high frequency power source circuit that applies high frequency voltage to the supply coil; a receiver coil provided on a receiver side device that is arranged facing the supply side device, the receiver coil receiving high frequency electric power by contactless electric power supply via electromagnetic coupling with the supply coil; a receiver circuit that converts the high frequency electric power received by the receiver coil and supplies power to an electric load of the supply side device; and a supplementary coil provided on the supply side device, the supplementary coil interlinking with at least a portion of a magnetic circuit that electromagnetically couples the supply coil and the receiver coil.

According to the contactless electric power supply device, it is possible to combine a supplementary coil into the magnetic circuit that configures the circuit of contactless electric power supply. Thus, using the supplementary coil, it is possible to measure at least one of the degree of electromagnetic coupling between the supply coil and the receiver coil, and the size of the supply current flowing through the supply coil. Accordingly, a highly functional contactless electric power supply device with added functionality is achieved while maintaining a simple configuration.

DESCRIPTION OF EMBODIMENTS

Figure 1:
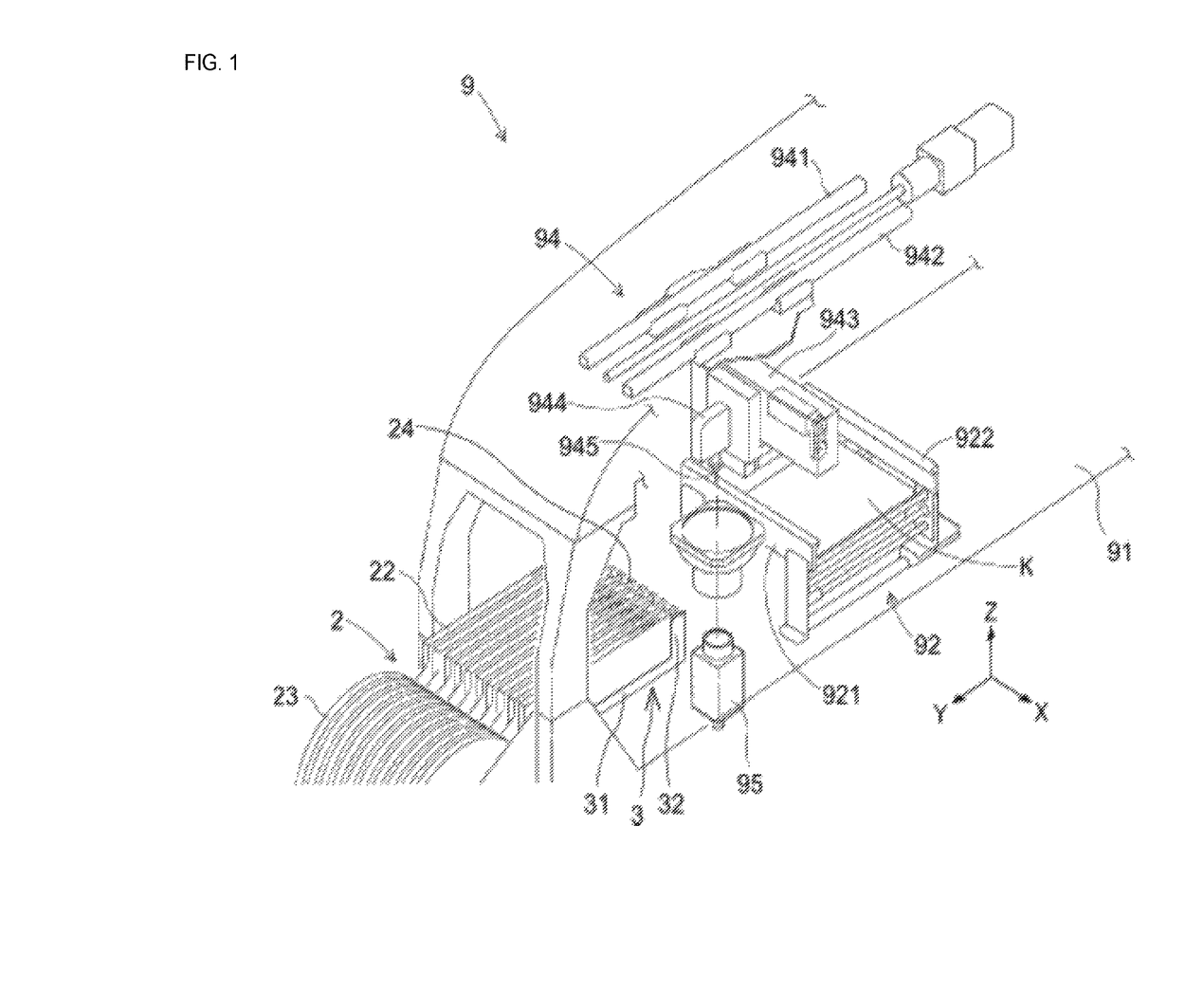
FIG. 1 is a perspective view showing the overall configuration of a component mounter equipped with a contactless electric power supply device that is an embodiment of the present disclosure.

An embodiment of contactless electric power supply device 1 of the present disclosure is described below with reference to FIGS. 1 to 10. FIG. 1 is a perspective view showing the overall configuration of a component mounter equipped with a contactless electric power supply device that is an embodiment of the present disclosure. In FIG. 1, the direction from the left rear to the front right in which board K is loaded and unloaded is the X-axis direction, the direction from the right rear to the front left is the Y-axis direction, and the vertical direction is the Z-axis direction. Component mounter 9 is configured from board conveyance device 92, multiple feeder devices 2, pallet member 3, component transfer device 94, component camera 95, and control device 96 (refer to FIG. 2) assembled on base 91. Board conveyance device 92, feeder devices 2, component transfer device 94, and component camera 95 are controlled from control device 96 such that each performs specified work.

Board conveyance device 92 loads board K to a mounting position, fixes board K in position, and unloads board K. Board conveyance device 92 is configured from items such as first and second guide rails 921 and 922, a pair of conveyor belts, and a clamping device. First and second guide rails 921 and 922 extend in the conveyance direction (X-axis direction) crossing the central upper portion of base 91, and are assembled on base 91 so as to be parallel to each other. A pair of conveyor belts (not shown) are arranged facing each other on the inside of first and second guide rails 921 and 92. The pair of conveyor belts revolve with both edges of board K in contact with the conveyance surface of the conveyor belts and load/unload board K to/from a mounting position set in a center section of base 91. A clamping device (not shown) is provided below the conveyor belts at the mounting position. The clamping device pushes up board K and clamps it in a horizontal state so as to fix it at the mounting position. This allows component transfer device 94 to perform mounting operation at the mounting position.

The multiple feeder devices 2 each consecutively supply electronic components. Feeder device 2 is flat and thin in the width direction (X-axis direction), and extends out in the vertical direction (Z-axis direction) and front-rear direction (Y-axis direction). Multiple feeder devices 2 are loaded in a line on the top surface of pallet member 3 in the width direction (X-axis direction). Each feeder device 2 includes main body section 22, supply reel 23 provided on the rear section of main body section 22, and component takeout section provided at the front edge of main body section 22. Long thin tape (not shown) in which many electronic components are housed at a specified pitch is wound around and held by supply reel 23. This tape is indexed at the specified pitch each time by mechanism section 54 (refer to FIG. 2) such that the electronic components are exposed and consecutively supplied to component takeup section 24. Further, a long thin protrusion section 25 (refer to FIG. 7) for positioning is provided on the bottom surface of feeder device 2 such that loading feeder device 2 on pallet member 3 is easy.

Pallet member 3 is for loading multiple feeder devices 2, and is detachably held on the top surface of base 91. Pallet member 3 is a component of the main body of component mounter 9, and is formed from bottom plate section 31 and front plate section 32. Bottom plate section 31 is a rectangular plate with a width dimension (dimension in the X-axis direction) smaller than the width dimension of base 91. Front plate section 32 is established on the front edge of bottom plate section 31. Slots 33 (refer to FIG. 7), which are grooves, extend in the front-rear direction (Y-axis direction) on the top surface of bottom plate section 31. Feeder device 2 is loaded on pallet member 3 by being slid from the rear towards front plate member 32 with protruding section 25 of the bottom surface inserted into slot 33 of bottom plate section 31. Eventually, feeder device 2 is loaded contacting bottom plate section 31 and front plate section 32 of pallet member 3.

Component transfer device 94 picks up a component from component take-out section 24 of each feeder device 2, moves the component to board K held at a fixed position and mounts the component on the board K. Component transfer device 94 is an XY robot type device that is capable of moving horizontally in the X-axis direction and the Y-axis direction. Component transfer device 94 is configured from pair of Y-axis rails 941 and 942, Y-axis slider 943, head holding section 944, suction nozzle 945, and the like. The pair of Y-axis rails 941 and 942 extend in the front-rear direction of base 91 (the Y-axis direction), and are provided above board conveyance device 92 and feeder device 2. Y-axis slider 943 is mounted on Y-axis rails 941 and 942 so as to be movable in the Y-axis direction. Head holding section 944 is mounted on Y-axis slider 943 so as to be movable in the X-axis direction. Head holding section 944 is driven horizontally in two directions (X-axis direction and Y-axis direction) by two servo motors. Suction nozzle 945 is exchangeably held on the lower surface head holding section 944. Suction nozzle 945 has a pickup opening at the lower end and picks up an electronic component at the pickup opening using negative pressure.

Component camera 95 is provided facing upwards on an upper surface of base 91 between board conveyance device 92 and component supply device 93. Component camera 95 detects the state of a picked up component by imaging the component as it is moved from feeder device 2 to above board K by suction nozzle 945. After component camera 95 detects the deviation in the pickup position and rotation and so on of the component, control device 96 performs fine adjustments of component mounting operation as necessary, and rejects components for which mounting is difficult.

Control device 96 is provided on base 91. Control device 96 stores a mounting sequence that defines the order of electronic components to be mounted on board K and the feeder devices 2 that supply the electronic components. Control device 96 controls component mounting operations according to the mounting sequence and based on imaging data of component camera 95, detection data of sensors that are not shown, and the like. Also, control device 96 sequentially collects and updates operating data such as production quantity of completed boards K, mounting time required to mount the electronic components, and occurrences of component pickup errors.

Figure 2:
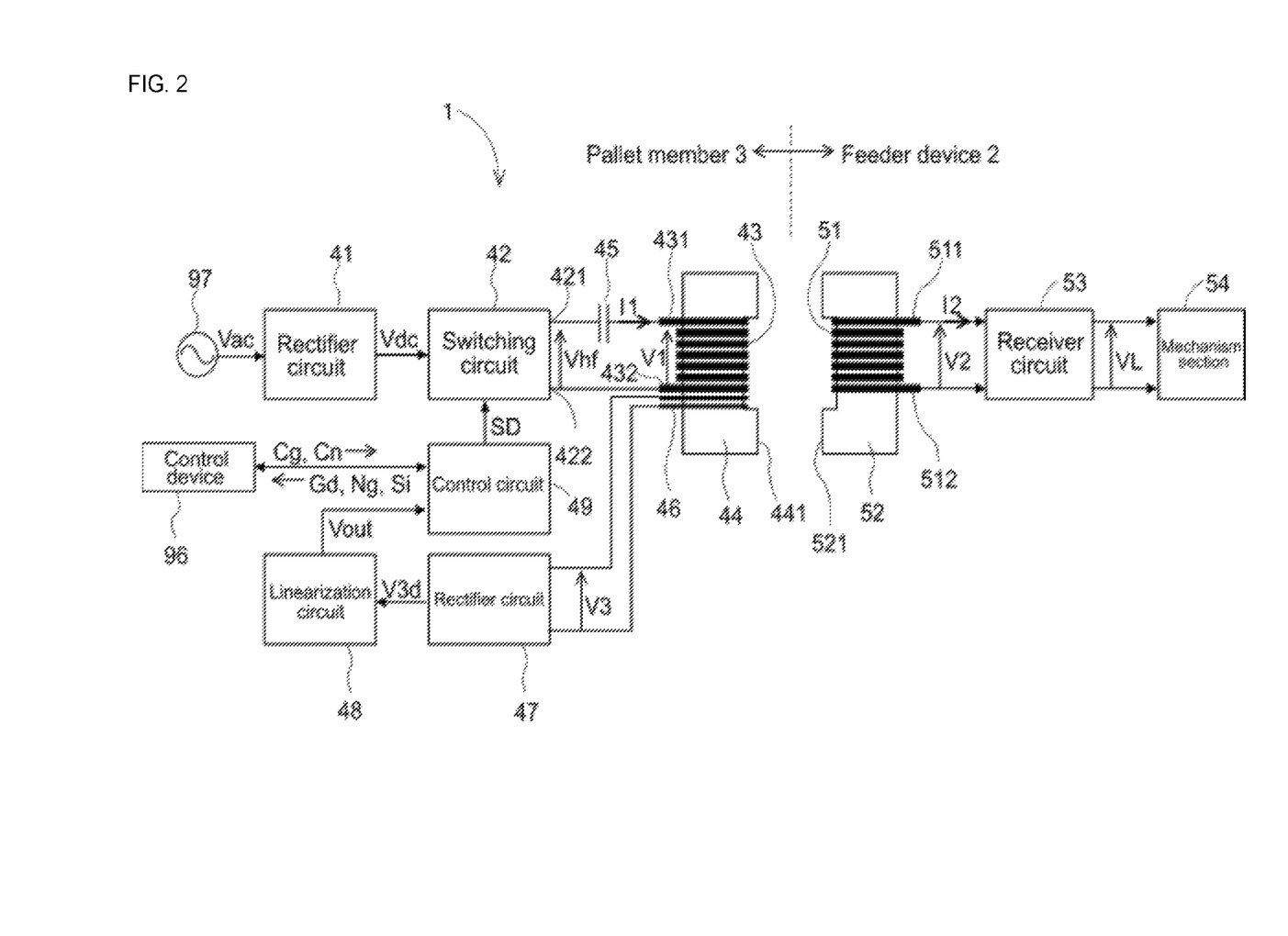
FIG. 2 schematically shows the configuration of the contactless electric power supply device of the embodiment.

Turning to a description of the embodiment of contactless electric power supply device 1. The embodiment of contactless electric power supply device 1 is a device that supplies electric power in a contactless manner from pallet member 3 to feeder device 2 using an electromagnetic coupling method. Pallet member 3 corresponds to the supply side device of the present disclosure, the main body of the board work machine, and the main body of component mounter 9. On the other hand, feeder device 2 corresponds to the receiver side device of the present disclosure, the loading device, and the component supply device. FIG. 2 schematically shows the configuration of the contactless electric power supply device of the embodiment.

Pallet member 3 includes as configuration elements of contactless electric power supply device 1, shown on the left in FIG. 2, rectifier circuit 41, switching circuit 42, supply coil 43, resonance capacitor 45, supplementary coil 46, rectifier circuit 47, linearization circuit 48, and control circuit 49. On the other hand, feeder device 2 includes as configuration elements of contactless electric power supply device 1, shown on the right of FIG. 2, receiver coil 51, and receiver circuit 53. Also, feeder device 2 includes a motor and control CPU inside mechanism section 54 as an electric load to which electric power is supplied.

Rectifier circuit 41 on the pallet member 3 side generates direct current voltage Vdc by rectifying alternating current voltage Vac of the commercial frequency (50 Hz or 60 Hz) of alternating current power supply 97, and supplies Vdc to switching circuit 42. A full-wave rectifier in which four diodes are bridge connected is shown as an example of rectifier circuit 41, but rectifier circuit 41 is not limited to this configuration.

Switching circuit 42, based on drive signal SD from control circuit 49, generates and outputs high frequency voltage Vhf by switch controlling direct current voltage Vdc. One of the output terminals of switching circuit 42, output terminal 421, is connected to terminal 431 of supply coil 43 via resonance capacitor 45. The other of the output terminals of switching circuit 42, output terminal 422, is directly connected to terminal 432 of supply coil 43. Thus, high frequency voltage Vhf is applied to the series circuit of resonance capacitor 45 and supply coil 43. Rectifier circuit 41 and switching circuit 42 configure the high frequency electric power source circuit of the present disclosure.

Supply coil 43 is formed by a conductor being wound around supply core 44 a specified number of times. Supply core 44 is a C-type core that includes connection surface 441 at both ends. However, the configuration is not limited to this, and supply core 44 may be an E-type core with a coil wound around a center core, or a core with another configuration. Examples of materials that configure supply core 44 are a ferrite or layered body of electromagnetic steel plate with high magnetic permeability, but may also be materials with low magnetic permeability such as aluminum. Supply coil 43, receiver coil 44, and supplementary coil 46 are provided towards the upper section of front plate 32 of pallet member 3.

Resonance capacitor 45 is connected in series to supply coil 43 to form a series resonance circuit. The inductance value of supply coil 43 and the capacitance of resonance capacitor 45 are designed suitably so as to give the desired resonance frequency fs. Resonance frequency fs is included in the output frequency range of switching circuit 42.

Here, as is well-known, supply coil 43 and resonance capacitor 45 have inductance of a pure imaginary number with different signs to each other. Thus, the size of high frequency primary voltage V1 generated between terminal 431 and terminal 432 of supply coil 43 may exceed the size of high frequency voltage Vhf of switching circuit 42. This phenomenon is conspicuous when a large supply current I1 flows through supply coil 43 for resonance frequency fs, but is not limited only to resonance frequency fs. Also, the magnetic flux passing through supply core 44 increases with the increase of primary voltage V1 and the excitation current in the region that is not magnetically saturated.

Supplementary coil 46 is formed by a conductor being wound around supply core 44 and is provided adjacent to supply coil 43. For supplementary coil 46, the area of the cross section of the conductor is smaller than that for supply coil 43, and the winding quantity is also fewer than the winding quantity of supply coil 43. In other words, winding ratio R3 of supplementary coil 46 with respect to supply coil 43 is smaller than one. High frequency tertiary voltage V3 measured at both ends of supplementary coil 46 is proportional to the magnetic flux passing through supply core 44 and is a value obtained by multiplying primary voltage V1 of supply coil 43 by winding ratio R3. Both ends of supplementary coil 46 are connected to rectifier circuit 47.

Rectifier circuit 47 generates direct current voltage V3$d$ by rectifying high frequency tertiary voltage V3 of supplementary coil 46 and outputs V3 to linearization circuit 48. As with rectifier circuit 41, a full-wave rectifier is shown as an example of rectifier circuit 47, but rectifier circuit 47 is not limited to this. Linearization circuit 48 linearizes direct current voltage V3$d$ that changes in a non-linear manner based on certain parameters, generates output signal Vout, and outputs Vout to control circuit 49. Here, as described below, parameters are the degree of electromagnetic coupling between supply core 44 and receiver core 52, and supply current I1. Linearization circuit 48, for example, is configured of an applicable integrated circuit.

Control circuit 49 receives commands Cg and Cn from control device 96, and sends notices Gd, Ng, and Si to control device 96. Control circuit 49 also performs specified calculating processing with respect to output signal Vout received from linearization circuit 48. Based on the results of calculation processing and command signals Cg and Cn from control device 96, control circuit 49 transitions between the three operations modes shown in FIG. 3, Mn, Mg, and Mi. Further, control circuit 49 outputs variable drive signal SD to switching circuit 42. Details of functions of control circuit 49 are given below during descriptions of operation.

Receiver coil 51 on the feeder device 2 side is formed by a conductor being wound around receiver core 52 a specified number of times. The area of the cross section of the conductor and the winding quantity of receiver coil 51 may be the same as or different to that for supply coil 43. In other words, winding ratio R2 of receiver coil 51 with respect to supply coil 43 may be one, larger than one, or smaller than one. Terminal 511 and terminal 512 of receiver coil 51 are connected to receiver circuit 53.

Receiver core 52 is a C-type core that includes connection surface 521 at both ends. It is desirable that receiver core 52 is configured from the same material as supply core 44, with the same shape, and having a broadly similar magnetic path cross section area. Receiver coil 51 and receiver core 52 are provided towards the upper section of the front surface of feeder device 2.

When the two connection surfaces 441 of supply core 44 and the two connection surfaces 521 of receiver core 52 are positioned facing each other, a closed magnetic circuit is formed. By supply core 44 and receiver core 52 forming a magnetic circuit, supply coil 43 and receiver coil 51 are electromagnetically coupled. By this, receiver coil 51 is able to receive high frequency electric power from supply coil 43 by contactless electric power supply. When this occurs, received current I2 flows from receiver coil 51 to receiver circuit 53. Also, supplementary coil 46 interlinks approximately overall with the magnetic path cross section area of the magnetic circuit.

The size of high frequency secondary voltage V2 generated between terminal 511 and terminal 512 of receiver coil 51 varies depending on the degree of electromagnetic coupling between supply core 44 and receiver core 52. That is, when connection surfaces 441 and 521 connect favorably with each other, the degree of coupling becomes approximately one, and the size of secondary voltage V2 is the value obtained by multiplying primary voltage V1 by the winding ratio R2. Also, when the connection state between connection surfaces 441 and 521 deteriorates, the degree of coupling drops below one, the size of secondary voltage V2 decreases.

Receiver circuit 53 converts the high frequency secondary voltage V2 received from receiver coil 51, generates specified output voltage VL, and supplies VL to an electric load of mechanism section 54. An example of a specified output voltage VL is a constant direct current voltage. Also, the specified output voltage VL may be a two-level direct current voltage with a different size corresponding to multiple types of electric loads. Thus, for example, even if the direct current drive voltage of the motor and the direct current control voltage of the CPU inside mechanism section 54 are different, both are supplied from receiver circuit 53. Further, receiver circuit 53 operates so as to maintain output voltage VL at a constant level even if secondary voltage V2 or received current I2 change due to the degree of electromagnetic coupling dropping or a load change of the electric load. Receiver circuit 53 may be configured from, for example, a combination of a full-wave rectifier circuit and a regulator (direct current constant voltage circuit).

Figure 3:
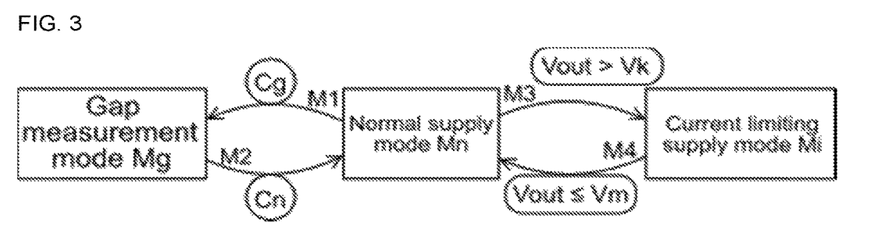
FIG. 3 is a mode transition diagram for showing the transition between operation modes of a control circuit.
Figure 4:
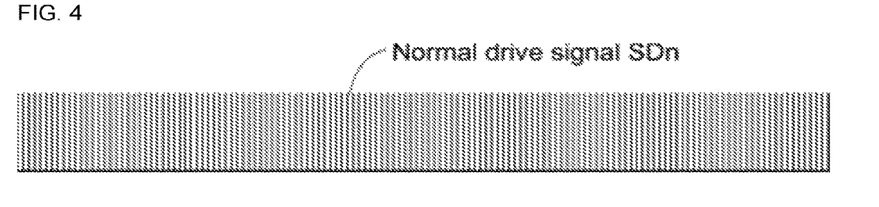
FIG. 4 is a waveform graph of the normal drive signal outputted by the control circuit to the switching circuit during normal supply mode.
Figure 5:
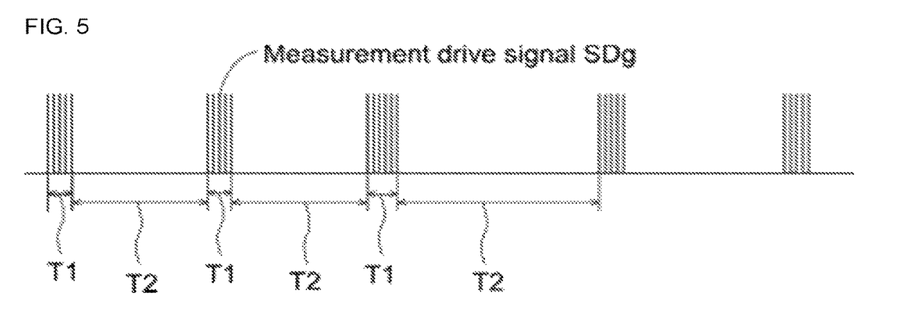
FIG. 5 is a waveform graph of the drive signal during measurement that is outputted by the control circuit to the switching circuit during gap measurement mode.
Figure 6:
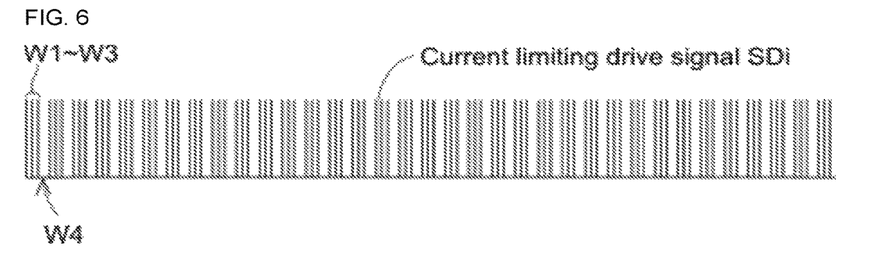
FIG. 6 is a waveform graph of the drive signal during current control that is outputted by the control circuit to the switching circuit during current limiting supply mode.

Described next is operation of contactless electric power supply device 1 of an embodiment configured as given above. FIG. 3 is a mode transition diagram for showing the transition between operation modes of control circuit 49. Control circuit 49 has normal supply mode Mn, gap measurement mode Mg, and current limiting supply mode Mi. Control circuit 49 outputs different drive signals SD for each of the operation modes Mn, Mg, and Mi to switching circuit 42. FIG. 4 is a waveform graph of normal drive signal SDn outputted by control circuit 49 to switching circuit 42 during normal supply mode Mn. FIG. 5 is a waveform graph of measurement drive signal SDg that is outputted by control circuit 49 to switching circuit 42 during gap measurement mode Mg. FIG. 6 is a waveform graph of current limiting drive signal SDi that is outputted by control circuit 49 to switching circuit 42 during current limiting supply mode Mi.

Normal drive signal SDn of FIG. 4 that is outputted by control circuit 49 in normal supply mode Mn is a continuous waveform of resonance frequency fs. By this, switching circuit 42 outputs a continuous waveform of high frequency voltage Vhf of resonance frequency fs. Accordingly, normally, contactless supply with good supply efficiency is performed using a series resonance circuit.

Figure 7:
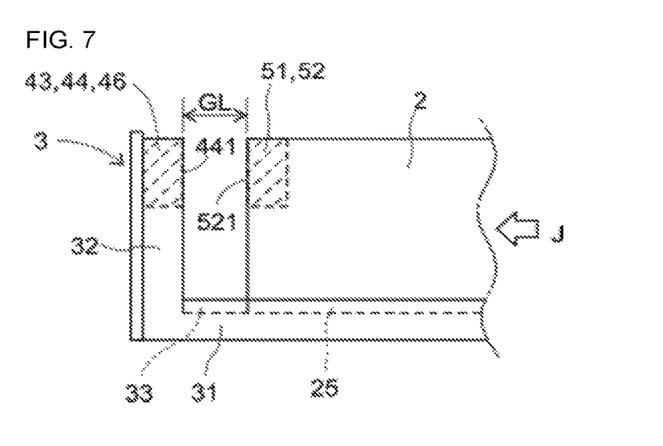
FIG. 7 is a side view showing the state when the feeder device is loaded on the pallet member.

Here, as shown in FIG. 7, feeder device 2 is considered to be in a state loaded on pallet member 3. FIG. 7 is a side view showing the state when feeder device 2 is loaded on pallet member 3. When feeder device 2 is loaded on pallet member 3, receiver coil 51 and receiver core 52 directly face supply coil 43 and supply core 44. Then, as shown by the white arrow J, when feeder device 2 is slid forwards (to the left in the figure), connection surfaces 441 of supply core 44 and connection surfaces 521 of receiver core 52 directly face other and either join or approach each other with gap GL decreasing.

If feeder device 2 is loaded favorably, connection surfaces 441 and 521 connect with each other, and gap GL substantially disappears. If feeder device 2 is not loaded favorably, some kind of error occurs between connection surfaces 441 and 521. For example, a gap GL remains between connection surfaces 441 and 521, or connection surfaces 441 and 521 are not parallel to each other, or a foreign object is sandwiched between connection surfaces 441 and 521, or a portion of connection surfaces 441 or 521 is broken or damaged. With this type of error, a defect occurs with the magnetic circuit, and the degree of electromagnetic coupling between supply coil 43 and receiver coil 51 drops. The variable that affects the degree of electromagnetic coupling the most is gap GL, but other variables as mentioned above also exist.

To monitor the above errors, control device 96 sends gap measurement command Cg to control circuit 49 immediately after feeder device 2 is loaded on pallet member 3. Control circuit 49 that has received gap measurement command Cg, as shown by arrow M1 in FIG. 3, transitions from normal supply mode Mn to gap measurement mode Mg. In gap measurement mode Mg, control circuit 49 sets the degree of electromagnetic coupling as the measurement target of supplementary coil 46, and causes drive signal SD to be measurement drive signal SDg. As shown in FIG. 5, measurement drive signal SDg is a burst waveform (intermittent waveform). Measurement drive signal SDg alternates to and from output period T1 during which five to six waveforms at a frequency shifted from resonance frequency fs are output, and rest period T2 during which a signal is not output.

Switching circuit 42 that has received measurement drive signal SDg outputs a burst waveform of high frequency voltage Vhf that largely resembles measurement drive signal SDg. By providing rest period T2 in the burst waveform, the high frequency electric power provided by contactless supply is made small. Also, by using a frequency shifted from resonance frequency fs, the resonance state no longer applies and high frequency electric power is reduced by a further level. Thus, the risk of damage to device 1 during measurement is substantially reduced or eliminated. Also, control device 96 performs prohibition control such that feeder device 2 does not perform component supply operation. When this occurs, the motor that forms an electric load of mechanism section 54 of feeder device 2 does not operate, meaning that only the control CPU operates, such that the load becomes substantially constant, thus creating load conditions that are favorable to measurement.

Figure 8:
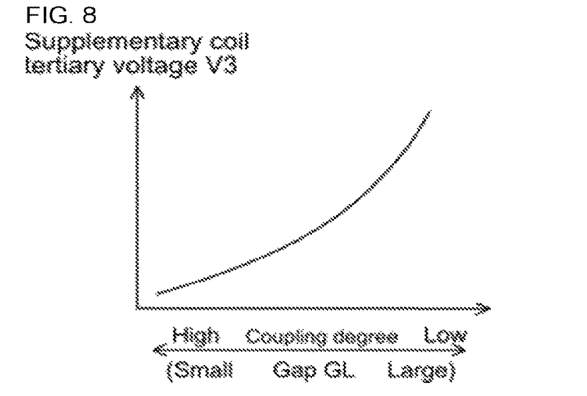
FIG. 8 qualitatively shows the relationship between the degree of electromagnetic coupling between the supply coil and the receiver coil and the tertiary voltage measured by the supplementary coil.

Here, we assume that the degree of electromagnetic coupling changes, and thus focus on tertiary voltage V3 measured by supplementary coil 46. As an example, consider a case in which the degree of coupling drops due to the connection state of connection surfaces 441 of supply core 44 and connection surfaces 521 of receiver core 52 changing from a favorable state to a state where gap GL gradually increases. When the degree of coupling drops, secondary voltage V2 decreases, but received current I2 increases due to the requirement to drive a constant electric load. Accordingly, supply current I1 increases, primary voltage V1 increases, and tertiary voltage V3 increases. That is, as shown in FIG. 8, as gap GL increases, thus lowering the degree of coupling, tertiary voltage V3 increases qualitatively. FIG. 8 qualitatively shows the relationship between the degree of electromagnetic coupling between supply coil 43 and receiver coil 51 and tertiary voltage V3 measured by the supplementary coil 46.

Figure 9:
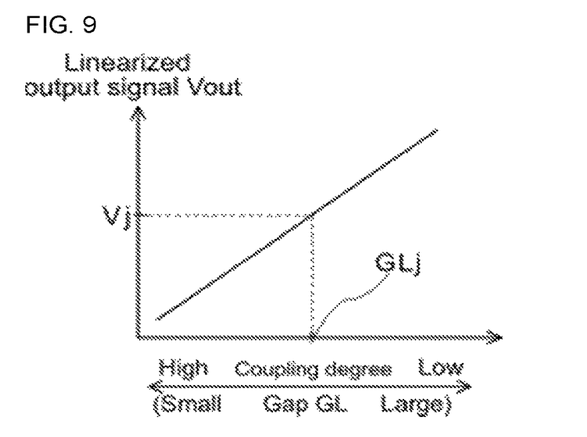
FIG. 9 shows the relationship between the degree of electromagnetic coupling and the linearized output signal of the tertiary voltage of the supplementary coil.

However, the waveform of tertiary voltage V3 is actually a high frequency burst waveform, and the increases does not change linearly, so cannot be used for judging whether the degree of coupling is good or bad. Therefore, tertiary voltage V3 is rectified by rectifier circuit 47, linearized by linearization circuit 48, and, as shown in FIG. 9, converted into output signal Vout. FIG. 9 shows the relationship between the degree of electromagnetic coupling and the linearized output signal Vout of tertiary voltage V3 of supplementary coil 46. As shown, output signal Vout increases in a straight line with a constant slope with respect to a decrease in the degree of electromagnetic coupling (an increase in gap GL).

Control circuit 49 receives output signal Vout and compares Vout with judgment value Vj used for determining whether the degree of coupling is good or bad. If output signal Vout is equal to or smaller than judgment value Vj, control circuit 49 judges that gap GL is equal to or smaller than specified gap GLj and thus that a sufficient degree of coupling is being maintained. Then, control circuit 49 sends good notification Gd to control device 96. If output signal Vout exceeds judgment value Vj, control circuit 49 judges that a sufficient degree of coupling is not being maintained, and sends defect notice Ng to control device 96.

Control device 96, upon receiving good notice Gd, because the degree of coupling has been confirmed as good, sends normal supply command Cn to control circuit 49. Along with this, control device 96 performs control to allow feeder device 2 to perform component supply operations. Control circuit 49 that has received normal supply command Cn, as shown by arrow M2 in FIG. 3, transitions from gap measurement mode Mg to normal supply mode Mn. On the other hand, control device 96, upon receiving defect notice Ng, notifies an operator of the defect and waits for the operator to respond. As understood from the above description, control circuit 49 operates as the measurement target control circuit of the present disclosure and the voltage control circuit of the present disclosure.

Next, in normal supply mode Mn, control circuit 49 sets the size of supply current I1 as the measurement target of supplementary coil 46, and causes drive signal SD to be normal drive signal SDn. In normal supply mode Mn, the degree of electromagnetic coupling does not change substantially, but the load of the motor of mechanism section 54 changes due to component supply operations. Here, even when the electric load increases, secondary voltage V2 does not change, thus received current I2 increases corresponding to the increase amount of the electric load. Accordingly, supply current I1 increases, primary voltage V1 increases, and tertiary voltage V3 increases. That is, when supply current I1 of the supply side increases due to an increase in the electric load on the receiver side, tertiary voltage V3 increases qualitatively.

Figure 10:
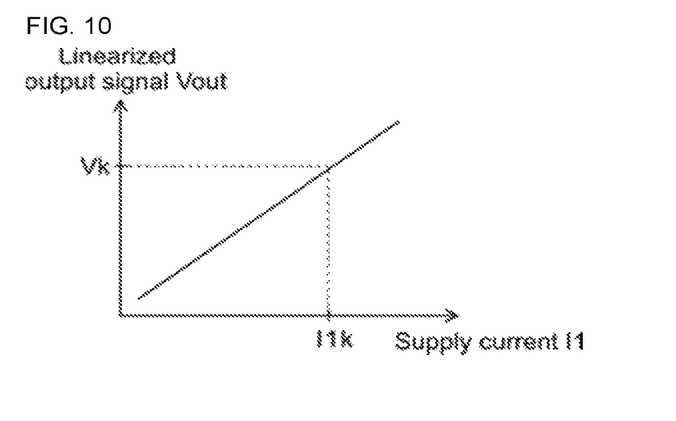
FIG. 10 shows the relationship between the size of the supply current and the linearized output signal of the tertiary voltage of the supplementary coil.

Similar to gap measurement mode Mg, this tertiary voltage V3 is rectified by rectifier circuit 47, linearized by linearization circuit 48, and, as shown in FIG. 10, converted into output signal Vout. FIG. 10 shows the relationship between the size of supply current I1 and the linearized output signal Vout of tertiary voltage V3 of supplementary coil 46. As shown, output signal Vout increases in a straight line with a constant slope with respect to an increase in supply current I1.

Control circuit 49 receives output signal Vout and compares Vout with specified judgment value Vk that differs from the value during gap measurement mode Mg, and judges whether mode transition is required. If output signal Vout is equal or to or smaller than Vk, control circuit 49 maintains normal supply mode Mn. If output signal Vout exceeds judgment value Vk, control circuit 49 judges that supply current is too large, and that device 1 is now at risk of damage due to excess current or that the risk of damage has increased. Then, as shown by arrow M3 of FIG. 3, control circuit 49 transitions to current limiting supply mode Mi.

In current limiting supply mode Mi, control circuit 49 causes drive signal SD to be current limiting drive signal SDi, and continues measurement of supply current I1 by supplementary coil 46. Also, control circuit 49 sends current limiting notification Si that indicates current limiting supply mode Mi is being used to control device 96. As shown in FIG. 6, current limiting drive signal SDi is a burst waveform (intermittent waveform) formed from a continuous waveform of resonance frequency fs for which a portion has been missed out. In the example shown in FIG. 6, a burst waveform (intermittent waveform) is repeated in which three continuous waveforms, W1 to W3, remain, and proceeding waveform W4 is missed out. Switching circuit 42 that has received current limiting drive signal SDi outputs a burst waveform of high frequency voltage Vhf that largely resembles current limiting drive signal SDi. With this burst waveform, because the effective value of supply current I1 is limited, the risk of damage to device 1 due to excess current is reduced or eliminated.

Control circuit 49 continues measurement of supply current I1, and compares output Vout with judgment value Vm. If output signal Vout exceeds Vm, control circuit 49 maintains current limiting supply mode Mi. Then, if output voltage Vout decreases to judgment value Vm or smaller, control circuit 49 judges that supply limiting is no longer required, and, as shown by arrow M4 in FIG. 3, transitions to normal supply mode Mn. As understood from the above description, control circuit 49 operates as the measurement target control circuit of the present disclosure and the current limiting control circuit of the present disclosure.

Contactless electric power supply device 1 of the present embodiment is provided with: supply coil 43 provided on pallet member 3; switching circuit 42 that applies high frequency voltage Vhf to supply coil 43; receiver coil 51 provided on feeder device 2 that is arranged facing pallet member 3, the receiver coil receiving high frequency electric power by contactless electric power supply via electromagnetic coupling with supply coil 43; receiver circuit 53 that converts the high frequency electric power received by receiver coil 51 and supplies power to an electric load of feeder device 2; and supplementary coil 46 provided on pallet member 3, supplementary coil 46 interlinking with at least a portion of a magnetic circuit that electromagnetically couples supply coil 43 and receiver coil 51.

Accordingly, it is possible to interlink and combine a supplementary coil into the magnetic circuit that configures the circuit of contactless electric power supply. Thus, using supplementary coil 46, it is possible to measure at least one of the degree of electromagnetic coupling between supply coil 43 and receiver coil 51, and the size of supply current I1 flowing through supply coil 43. Accordingly, a highly functional contactless electric power supply device 1 with added functionality is achieved while maintaining a simple configuration.

Further, with contactless electric power supply device 1 of the present embodiment, supplementary coil 46 measures the degree of electromagnetic coupling between supply coil 43 and receiver coil 51. In addition, also provided is control circuit 49 (voltage control circuit) that, when supplementary coil 46 is measuring the degree of electromagnetic coupling, performs control to switch to and from a continuous waveform and burst waveform of high frequency voltage Vhf, thus causing the high frequency electric power supplied by contactless electric power supply to be smaller.

Accordingly, by providing rest period T2 in the burst waveform, the high frequency electric power provided by contactless supply is made small. Thus, the risk of damage to device 1 during measurement is reduced.

Also, with contactless electric power supply device 1 of the present embodiment, further provided is resonance capacitor 45 that connects in series to supply coil 43 to form a resonance circuit, and control circuit 49 normally maintains the frequency of high frequency voltage Vhf at resonance frequency fs while supplementary coil 46 is not measuring the degree of electromagnetic coupling, and shifts the frequency of high frequency voltage Vhf from resonance frequency fs while supplementary coil 46 is measuring the degree of electromagnetic coupling.

Accordingly, normally, contactless power supply with good supply efficiency is performed using a series resonance circuit. Also, during measurement, because the resonance state no longer applies, high frequency electric power supplied by contactless power supply is reduced by a further level. Thus, the risk of damage to device 1 during measurement is substantially reduced or eliminated.

Also, with contactless electric power supply device 1 of the present embodiment, supplementary coil 46 measures the size of supply current I1 flowing through supply coil 43 due to high frequency voltage Vhf. In addition, also provided is control circuit 49 (current control circuit) that, when the size of supply current measured by supplementary coil 46 is too large, performs control to switch to and from a continuous waveform and burst waveform of high frequency voltage such that supply current I1 is limited.

Accordingly, because the effective value of supply current I1 is limited by the burst waveform formed by missing out a portion of the continuous waveform, the risk of damage to device 1 due to excess current is reduced or eliminated.

Also, with contactless electric power supply device 1 of the present embodiment, supplementary coil 46 is configured to switch between measuring the degree of electromagnetic coupling between supply coil 43 and receiver coil 51 and measuring the size of supply current I1 that flows through supply coil 43 due to high frequency voltage Vhf, and further provided is control circuit 49 (measurement target control circuit) that sets the switching of supplementary coil 46 between measuring the degree of electromagnetic coupling and measuring the size of supply current I1, and variably controls high frequency voltage Vhf to be suitable for the measurement target of supplementary coil 46.

Thus, using supplementary coil 46, it is possible to switch between measuring both the degree of electromagnetic coupling between supply coil 43 and receiver coil 51, and the size of supply current I1 flowing through supply coil 43. Accordingly, an even more highly functional contactless electric power supply device 1 with two types of added functionality is achieved while maintaining a simple configuration.

Further, with contactless electric power supply device 1 of the present embodiment, control circuit 49 sets the measurement target of supplementary coil 46 to the degree of electromagnetic coupling directly after feeder device 2 is arranged to face pallet member 3, and switches the setting of the measurement target of supplementary coil 46 to the size of supply current I1 after confirming that the degree of electromagnetic coupling is favorable.

Accordingly, because it is possible to confirm the loading state directly after feeder device 2 has been loaded on pallet member 3, feeder devices 2 for which the loading state is poor are not used. Also, when it is confirmed that the loading state is favorable, control is performed to allow feeder device 2 to perform component supply operations, and smooth transition to measurement of supply current I1 is possible.

Further, with contactless electric power supply device 1 of the present embodiment, supply coil 43 provided on pallet member 3 of component mounter 9 performs electromagnetic coupling and includes supply core 44 on which is wound supplementary coil 46, receiver coil 51 provided on feeder device 2 includes receiver core 52 that cooperates with supply core 44 to perform electromagnetic coupling, and, when feeder device 2 is loaded on pallet member 3, connection surfaces 441 of supply core 44 and connection surfaces 521 of receiver core 52 either join or approach each other with the size of gap GL decreasing.

Accordingly, when feeder device 2 is loaded on pallet member 3, it is possible to reliably judge as an error a loading state in which a large gap GL remains because feeder device 2 has not been slid sufficiently.

Note that, measurement drive signal SDg used for gap measurement mode Mg in the present embodiment is not limited to the burst waveform shown in FIG. 5. For example, the signal may have a high frequency continuous waveform shifted from resonance frequency fs. Also, for example, reduction control of direct current Vdc may be performed while using the continuous waveform of resonance frequency fs. With the above two examples of different waveforms as well, the risk of damage to device 1 during measurement is reduced. Also, the method of limiting the effective value of supply current I1 in current limiting supply mode Mi may be other than the burst waveform (intermittent waveform) shown in FIG. 6. For example, reduction control of direct current Vdc may be performed while using the continuous waveform of resonance frequency fs.

Further, the quantity or connection method of resonance capacitor 45 may be changed; for example, a capacitor may be added in series connection to receiver coil 51 on the feeder device 2 side. Also, by setting judgment values other than those described above in control circuit 49, and comparing them to measurement results using supplementary coil 46, various judgments and complex control can be performed. For example, problems in the contactless electric power supply circuit could be monitored from the change over time of output signal Vout, or judgment made as to whether attachment or detachment of feeder device 2 had occurred from rising patterns over time of output signal Vout. Various other applications and modifications are possible for the present disclosure.

INDUSTRIAL APPLICABILITY

Use of the contactless electric power supply device of the present disclosure is not limited to feeder device 2 of component mounter 9 described in the embodiment above; use may be applied widely, such as to other types of board work machines and processing machines and assembly machines that produce other goods.

REFERENCE SIGNS LIST

1: contactless electric power supply device; 2: feeder device (receiver side device, loading device); 3: pallet member (supply side device, main body of board work machine); 41: rectifier circuit; 42: switching circuit; 43: supply coil; 44: supply core; 441: connection surface; 45: resonance capacitor; 46: supplementary coil; 47: rectifier coil; 48: linearization circuit; 49: control circuit (voltage control circuit, current control circuit, measurement target control circuit); 51: receiver coil; 52: receiver core; 521: connection surface; 53: receiver circuit; 54: mechanism section (electric load); 9: component mounter; 91: base; 92: board conveyance device; 94: component transfer device; 95: component camera; 96: control device; Vhf: high frequency voltage; SD: drive signal; Vout: output signal; V1: primary voltage; V2: secondary voltage; V3: tertiary voltage; I1: supply current; I2: received current; GL: gap

The invention claimed is:

1. A contactless electric power supply device comprising:
a supply coil provided on a supply side device;
a supply circuit configured to apply a high frequency voltage to the supply coil;
a receiver coil provided on a receiver side device that is arranged facing the supply side device, the receiver coil receiving high frequency electric power by contactless electric power supply via electromagnetic coupling with the supply coil;
a receiver circuit configured to convert the high frequency electric power received by the receiver coil and supply power to an electric load of the receiver side device; and
a supplementary coil provided on the supply side device, wherein
the supplementary coil is electromagnetically coupled with at least a portion of an electromagnetic field from the electromagnetic coupling between the supply coil and the receiver coil,
the supply circuit is configured to measure a first parameter of the supplementary coil to determine a degree of electromagnetic coupling between the supply coil and the receiver coil,
the degree of electromagnetic coupling is representative of a gap between the supply side device and the receiver side device, and
the supply circuit includes a voltage control circuit configured to decrease the high frequency electric power received in the contactless manner, by controlling at least one of a frequency, a voltage value, and a switching between a continuous wave form and a burst wave form of the high frequency voltage, when the first parameter of the supplementary coil is measured to determine the degree of electromagnetic coupling.

2. The contactless electric power supply device according to claim 1, further including:
a resonance capacitor that connects to at least one of the supply coil and the receiver coil to form a resonance circuit, wherein
the voltage control circuit is configured to maintain the frequency of the high frequency voltage at a resonance frequency of the resonance circuit while the first parameter of the supplementary coil is not measured to determine the degree of electromagnetic coupling, and shift the frequency of the high frequency voltage from the resonance frequency while the first parameter of the supplementary coil is measured to determine the degree of electromagnetic coupling.

3. The contactless electric power supply device according to claim 1, wherein the supply circuit is configured to measure a second parameter of the supplementary coil to determine a size of supply of electric current that flows through the supply coil due to the high frequency voltage.

4. The contactless electric power supply device according to claim 3, wherein the supply circuit includes a current control circuit configured to restrict a supply of electric current, by controlling at least one of the voltage value and the switching between the continuous wave form and the burst wave form of the high frequency voltage, when the size of the supply of the electric current is greater than a predetermined value.

5. The contactless electric power supply device according to claim 3, wherein the first parameter is a voltage.

6. The contactless electric power supply device according to claim 5, wherein the second parameter is a voltage.

7. The contactless electric power supply device according to claim 1, wherein
the supply circuit is configured to switch between measuring the first parameter of the supplementary coil to determine the degree of electromagnetic coupling between the supply coil and the receiver coil and measuring a second parameter of the supplementary coil to determine a size of supply of electric current that flows through the supply coil due to the high frequency voltage, and
the supply circuit further includes a measurement target control circuit configured to set the switching between measuring the first parameter of the supplementary coil to determine the degree of electromagnetic coupling and measuring the second parameter of the supplementary coil to determine the size of the supply of the electric current, and variably controls the high frequency voltage for the measurement target.

8. The contactless electric power supply device according to claim 7, wherein the measurement target control circuit is configured to:
set the measurement target to measuring the first parameter of the supplementary coil to determine the degree of electromagnetic coupling directly after the supply side device is arranged to face the receiver side device, and
switches the setting of the measurement target to measuring the second parameter of the supplementary coil to determine the size of the supply of the electric current after confirming that the degree of electromagnetic coupling meets a predetermined value.

9. The contactless electric power supply device according to claim 8, wherein the first parameter is a voltage.

10. The contactless electric power supply device according to claim 9, wherein the second parameter is a voltage.

11. The contactless electric power supply device according to claim 7, wherein the first parameter is a voltage.

12. The contactless electric power supply device according to claim 11, wherein the second parameter is a voltage.

13. The contactless electric power supply device according to claim 1, wherein
the supply side device includes a main body of a board work machine that performs specified work on a board, and
the receiver side device includes a loading device that is loaded on the board work machine.

14. The contactless electric power supply device according to claim 13, wherein
the main body of the board work machine includes a main body of a component mounter that mounts electronic components on the board,
the loading device includes a component supply device that is detachably loaded on the component mounter and that supplies the electronic components,
the supply coil of the main body of the component mounter performs the electromagnetic coupling and includes a supply core on which is wound the supplementary coil,
the receiver coil of the component supply device includes a receiver core that cooperates with the supply core to perform the electromagnetic coupling, and
when the component supply device is loaded on the main body of the component mounter, a connection surface of the supply core and a connection surface of the receiver core face each other and either join or approach each other with a size of the gap between the connection surfaces decreasing.

15. A board work machine that performs specified work on a board, comprising:
a main body;
a loading device that is loaded on the board work machine; and
the contactless electric power supply device according to claim 1, wherein
the main body includes the supply side device, and
the loading device includes the receiver side device.

16. The board work machine according to claim 15, further comprising:
a component mounter that mounts electronic components on the board; and
a component supply device that is detachably loaded on the component mounter and that supplies the electronic components, wherein
the main body of the board work machine includes a main body of the component mounter,
the loading device includes the component supply device,
the supply coil of the main body of the component mounter performs the electromagnetic coupling and includes a supply core on which is wound the supplementary coil,
the receiver coil of the component supply device includes a receiver core that cooperates with the supply core to perform the electromagnetic coupling, and
when the component supply device is loaded on the main body of the component mounter, a connection surface of the supply core and a connection surface of the receiver core face each other and either join or approach each other with a size of the gap between the connection surfaces decreasing.

17. A board work machine that performs specified work on a board, comprising:
a pallet member;
a plurality of component supply devices detachably mounted along a line in a width direction of the pallet member and on a top surface of the pallet member; and
the contactless electric power supply device according to claim 1, wherein
the pallet member includes the supply side device,
a component supply device of the plurality of component supply devices includes the receiver side device,
the supply coil includes a supply core on which is wound the supplementary coil,
the receiver coil includes a receiver core that cooperates with the supply core to perform the electromagnetic coupling,
the component supply device includes a long thin protrusion on a bottom surface of the component supply device for positioning the component supply device on the top surface of the pallet member, and
when the component supply device is slid in an installation direction, a connection surface of the supply core and a connection surface of the receiver core directly face each other and either join or approach each other with the a size of the gap between the connection surfaces decreasing.

18. The contactless electric power supply device according to claim 1, wherein the supply side device includes a pallet member of a board work machine that performs specified work on a board, the receiver side device includes a component supply device of a plurality of component supply devices detachably mounted along a line in a width direction of the pallet member and on a top surface of the pallet member, the supply coil includes a supply core on which is wound the supplementary coil, the receiver coil includes a receiver core that cooperates with the supply core to perform the electromagnetic coupling, the component supply device includes a long thin protrusion on a bottom surface of the component supply device for positioning the component supply device on the top surface of the pallet member, and when the component supply device is slid in an installation direction, a connection surface of the supply core and a connection surface of the receiver core directly face each other and either join or approach each other with the a size of the gap between the connection surfaces decreasing.

19. The contactless electric power supply device according to claim 1, wherein the first parameter is a voltage.

* * * * *

UNITED STATES PATENT AND TRADEMARK OFFICE
CERTIFICATE OF CORRECTION

PATENT NO. : 10,305,326 B2
APPLICATION NO. : 15/324907
DATED : May 28, 2019
INVENTOR(S) : Masaru Saito et al.

Page 1 of 1

It is certified that error appears in the above-identified patent and that said Letters Patent is hereby corrected as shown below:

On the Title Page

Item (71), should read:
--FUJI CORPORATION, Chiryu (JP)--

Signed and Sealed this
Twenty-eighth Day of April, 2020

Andrei Iancu
*Director of the United States Patent and Trademark Office*